Sept. 3, 1929.  R. J. McCARTY, JR  1,726,625
FLUID CONVEYING SYSTEM
Filed Oct. 28, 1926
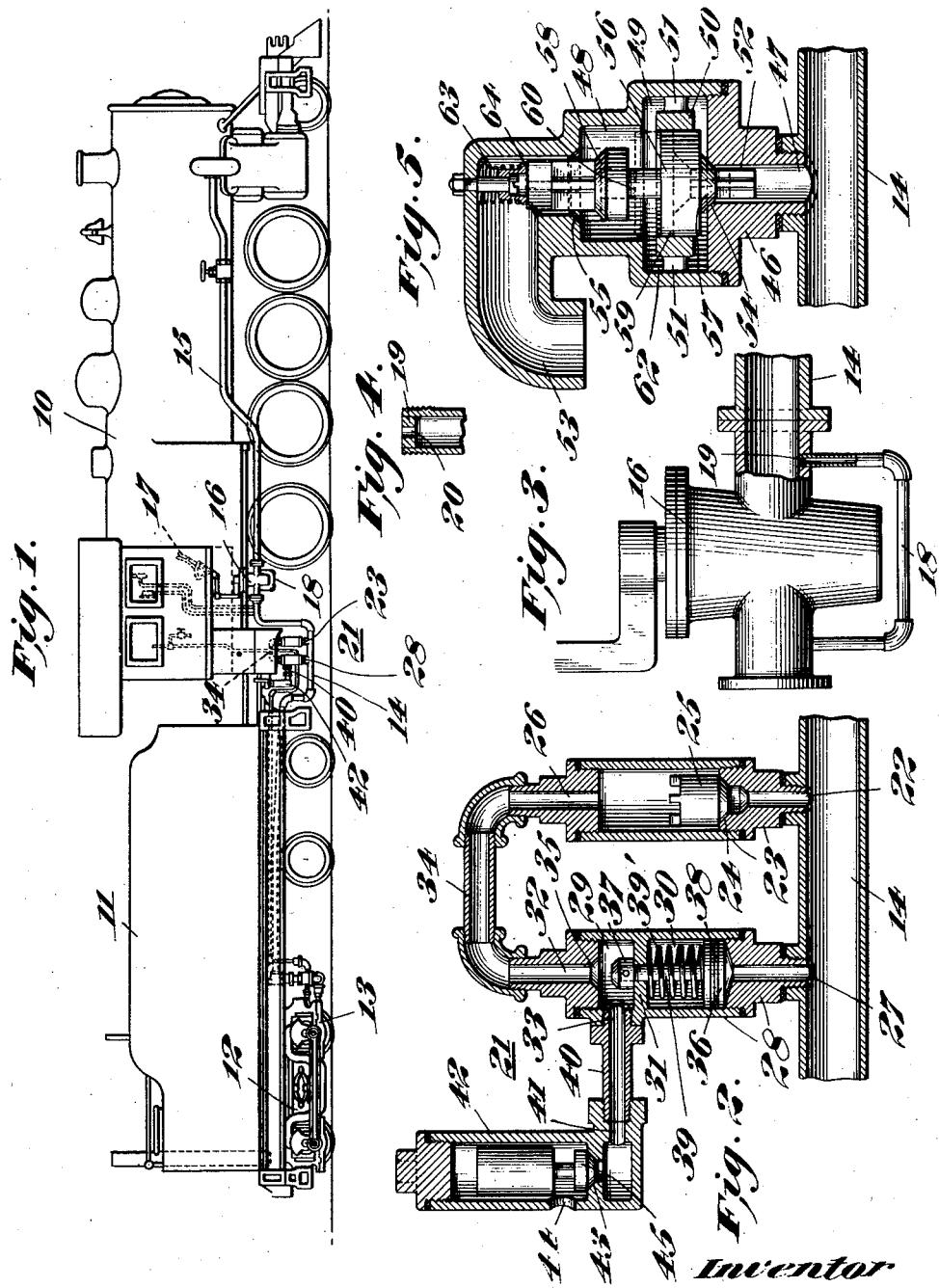
Inventor
Richard J. McCarty, Jr.
By R. S. C. Dougherty
Attorney Patented Sept. 3, 1929.

1,726,625

UNITED STATES PATENT OFFICE.

RICHARD J. McCARTY, JR., OF BETHLEHEM, PENNSYLVANIA, ASSIGNOR TO BETHLEHEM STEEL COMPANY.

FLUID-CONVEYING SYSTEM.

Application filed October 28, 1926. Serial No. 144,777.

My invention relates to valves and particularly to relief valves.

The device embodying my invention is particularly useful in connection with auxiliary locomotives of the type illustrated and described in an application for Letters Patent Serial #130,606, filed by R. S. A. Dougherty and John A. McGrew under date of August 21, 1926. Said application relates to an auxiliary engine mounted intermediate the axles of a tender. The motive fluid for the auxiliary locomotive is supplied by the steam pipe that connects the main steam pipe of the main locomotive with the steam chest of the auxiliary locomotive. The motive fluid is controlled by a throttle valve operated from the engineer's cab. As fully described in the aforementioned application when the auxiliary locomotive is started, it is automatically placed in gear with a normally idle axle of the tender truck. When the auxiliary engine is not in operation it has been found desirable to allow low pressure steam to flow through the steam pipe and pass out through the cylinder cocks to the atmosphere. This is particularly desirable in cold weather. Furthermore the lubrication of the engine is generally provided for by means of a hydrostatic lubricator located in the cab. This lubricator has two connections, one of which is a steam pipe from the locomotive boiler while the other is an oil feed pipe from the lubricator to the auxiliary steam line. When the auxiliary engine is not in operation it is customary to have the valve controlling the lubricator steam supply open, allowing low pressure steam to flow to the auxiliary steam line. The engine is provided with automatic cylinder cocks which remain open until sufficient pressure builds up in the cylinders to close them. The low pressure steam for warming purposes, is not sufficient to close the cylinder cocks with the result that the heater steam passes freely to the atmosphere provided the cylinder cocks are not obstructed.

The auxiliary engine is designed so that the driving gears will automatically mesh with a normally idle axle of the truck when it receives steam at a sufficient pressure to turn it over. Such pressure is usually about 15 lbs. per square inch and as various combinations of conditions may occur to raise the pressure of the heater steam, such as leaky throttle valves or stuck or obstructed cylinder cocks, the engine may be caused to start and the gears engage at high train speed or when the locomotive is running backward which might be detrimental to the auxiliary engine mechanism.

It is the primary object of my invention to provide a relief device for maintaining a low pressure within the auxiliary steam line and prevent the pressure from building up sufficiently to accidentally turn the engine over.

Another object of my invention is to provide a means to render said relief device ineffective when the throttle is opened and steam at a comparatively high pressure is allowed to pass to the engine to start same.

Broadly stated, my invention comprises a conduit for conveying steam to the auxiliary engine having an outlet which permits the escape of steam, and a weighted valve which is exposed to the pressure of the steam in said conduit and which is moved to close said outlet when the pressure within said conduit reaches a certain amount.

The novel features of my invention will be more fully understood from the following description and claims taken with the accompanying drawings in which:

Fig. 1 is a side elevation of a locomotive and tender embodying one form of my invention;

Fig. 2 is a cross section illustrating one form of my relief device;

Fig. 3 is a side elevation of the throttle valve housing shown in Fig. 1 somewhat enlarged, being partially in cross section to illustrate bypass around the valve.

Fig. 4 is a cross section somewhat enlarged showing the choke diaphragm in the mouth of the bypass shown in Fig. 3; and Fig. 5 is a modified form of relief device.

Referring to the drawings: 10 indicates a locomotive having a boiler of usual construction for generating steam and coupled to a tender 11. An auxiliary engine 12 is suspended intermediate the axles of the rear tender truck 13 and is adapted to be entrained with a normally idle axle of said truck in the manner set forth in the aforementioned application.

A steam line 14 conveys the steam from the main steam line 15 to the auxiliary engine 12. A throttle valve 16 is provided in the steam line 14 which is operated by a lever 17 located in the engineer's cab. A bypass pipe 18, see Fig. 3, is provided in the steam line 14 to convey steam around the throttle valve 16 to the auxiliary engine for heating purposes when said valve is shut down. A choke diaphragm 19 is secured at the inlet end of the bypass pipe 18. In order to restrict the passage of the steam through the bypass pipe and furnish low pressure steam for heating purposes to the auxiliary engine the aperture 20 in the choke 19 is relatively small in diameter.

Under normal conditions, when the locomotive is propelled forward at high speeds or is reversed and the auxiliary engine is inactive and disengaged from the axle of the tender truck, it is the purpose of the bypass to supply low pressure steam to the auxiliary engine to heat same, such steam passing out through the cylinder cocks (not shown) to the atmosphere. If, however, it is desired to propel the locomotive with the aid of the auxiliary engine, then, the engineer cracks the throttle valve 16 and materially increases the pressure of the steam passing to the engine, thereby blowing out all condensate, which may have collected in the system, and automatically closing the cylinder cocks in a manner well known to the art. The pressure builds up within the cylinders of the auxiliary engine, sufficiently to turn same over, thereby causing it to be entrained with the driven axle of the tender, in a manner fully described in the aforementioned application.

If, however, due to certain conditions such as leaky throttle valve or stuck or obstructed cylinder cock, the pressure within the system builds up sufficiently to turn over the auxiliary engine and cause entrainment thereof with the tender axle, at a time when the main locomotive is running at relatively high speeds or in reverse it would be detrimental to the auxiliary engine mechanism. In order to anticipate such a condition I provide a relief device 21 located in the auxiliary pipe line intermediate the throttle valve and the auxiliary engine. Referring to Fig. 2 the steam line 14 is apertured as at 22 to provide an outlet. The aperture is threaded to receive a valve housing 23 which is provided with a valve seat 24 receptive of the check valve 25 contained in the housing. At its upper end the housing 23 is provided with an outlet aperture 26. A second outlet aperture 27 is provided in the steam line 14 which is threaded to receive the valve housing 28. The latter is divided into two chambers 29 and 30 which are separated by an apertured diaphragm 31. The upper chamber 29 has an inlet aperture 32 and laterally disposed outlet aperture 33. The inlet aperture 32 communicates with the outlet aperture 26 through the medium of the pipe 34 and is provided at its opening at the interior of the housing 28 with a valve seat 35. The housing 28 contains a valve 36 comprising a valve plate portion 37 and a piston portion 38 connected together by a stem portion 39. The piston portion 38 has a close sliding fit in the chamber 30 and the stem portion extends through the aperture in the diaphragm 31. The valve plate portion 37 is contained in the chamber 29 and is adapted to engage the seat 35 when the valve 36 is moved upwardly. The valve is constrained to its lower position by means of a coil spring 39' interposed between the piston portion 38 and the diaphragm 31.

The outlet aperture 33 is connected by means of the pipe 40 to the inlet 41 of the housing 42. The latter is provided with a valve seat 43 and an outlet aperture 44. A weight valve 45 is slidably mounted within the housing 42 and normally rests in its closed position on the valve seat 43 thereby closing the inlet aperture 41. The valve 45 constitutes a relief valve and is weighted so as to maintain a predetermined pressure within the steam line 14.

The safety device described above operates as follows: Assuming that it is desired to maintain a pressure of 2 lbs. per square inch within the steam line 14 so as to provide low pressure heater steam to the engine, the valve 45 is weighted accordingly. If the pressure rises due to circumstances extraneous to normal operating conditions, then the steam escapes past the check valve 25 and having a free passage to the housing 42 lifts the valve 45 and escapes to the atmosphere by way of the outlet aperture 44. The pressure within the system is thus reduced and danger of building up a pressure sufficient to start the engine 12 is eliminated.

When it is desired to start the engine 12 for the purpose of propelling the locomotive, the engineer cracks the throttle valve 16 and allows steam to pass to the engine in sufficient quantity to blow out the condensate through the cylinder cocks. As the engineer continues to open the throttle valve, this causes a rush of steam to the engine where it meets with resistance, builds up a pressure within the steam line 14, between said valve of the engine, and automatically closes the cylinder cock in a manner well known to the art. This increased pressure acts on the lower face of the piston portion 38 of the valve 36 by way of outlet aperture 27 which opens into the lower end of chamber 29. The coil spring 39 is designed to be compressed when a predetermined pressure is reached within the steam line 14. When this pressure is reached the valve 36 moves upwardly and closes the inlet aperture 32 and thus renders the valve 45 ineffective to allow the escape of steam. This traps a pocket of steam in the space intermediate the check valve 25 and the valve 36 which will condense, reduce the pressure and cause the check valve 25 to raise. This action restores the pressure and drains the condensate automatically. When the throttle valve is closed, to shut down the engine 12, the pressure in the steam line drops to substantially atmospheric pressure and the check valve 25 is pressed to its seat by the pressure on its upper face, which pressure also assists the spring 39' in the opening of the valve 36. The steam thus released escapes through the relief valve 45.

Fig. 5 illustrates a modified relief device structure wherein the principle involved in the valve construction described above is embodied in a single valve construction. The valve housing 46 is threaded in an outlet aperture 47 formed in the steam line 14. The housing 46 is provided with an upper chamber 48 and an enlarged lower chamber 49 opening into said upper chamber. Concentric with the upper chamber is a guide ring 50 which is supported by spaced ribs 51 extending inwardly and radially from the wall of the housing 46.

The housing 46 is provided with inlet and outlet apertures 52 and 53 respectively. Valve seats 54 and 55 are formed in the body of the housing concentric with said inlet and outlet apertures respectively. A valve member 56 is slidably mounted within the housing 46 and comprises a lower valve plate portion 57, an upper valve plate portion 58, a piston portion 59 and a stem portion 60 which connects the piston portion to the upper valve plate portion 58. The latter portion is adapted to coact with the valve seat 55 and the lower valve plate portion 57 is adapted to coact with the valve seat 54. The piston portion 59 slidably fits within the bore of the guide ring 50. The valve 56 is urged to its lowermost position by gravity and the valve plate 57 engages with the seat 54, thus closing the outlet from the steam line 14. The valve 56 in its lowermost position constitutes a relief valve and is weighted so as to maintain a certain pressure of steam within the steam line 14 for the purpose of heating the engine 12. When the pressure is raised above a certain amount, by reason of a leaky throttle valve or other conditions extraneous to normal conditions, the valve 56 lifts and allows steam to escape through the annular passage 62, formed between the guide ring 50 and the inner wall of the housing 46, to the atmosphere. When the throttle valve 16 is opened, in order to start the engine, the rush of steam at considerable pressure and comparatively large volume through the narrow annular passage 62 would create a resistance at that point, build up a pressure below the piston portion 59 and cause the valve to raise and force the upper valve plate 58 in contact with the valve seat 55. This prevents the escape of steam from the steam line 14. When the throttle valve is closed, to stop the engine, the valve 56 drops back to its original position and then functions once more as a relief valve. In order to somewhat oppose the momentum of the valve 56 as it moves upwardly to engage the seat 55 and prevent hammering, I provide a cushioning device 63 which is secured to the housing 46 in the line of travel of said valve. This device may be of any well known construction suitable for the purpose. The cushioning device illustrated comprises, spring pressed abutment member 64 which yieldingly engages the upper end of the valve 56 in advance of its extreme uppermost position and thus cushions the force with which it is moved into engagement with the seat 55.

From the foregoing description it will be seen that I have devised a simple and novel relief device which operates automatically to maintain a low pressure in the steam line to an engine for heating purpose, and operates automatically to prevent the escape of the steam when motive fluid is supplied to the engine.

While I have shown my invention in but two forms, it will be obvious to those skilled in the art that it is not so limited, but is susceptible of various other changes and modifications without departing from the spirit thereof, and, I desire, therefore, that only such limitations shall be placed thereupon as are imposed by the prior art or as are specifically set forth in the appended claims.

Having thus described my invention what I claim as new and desire to secure by Letters Patent is:

1. In a fluid conveying system, a valve housing having inlet and outlet apertures, a weighted valve within the housing in its closed position with respect to said outlet adapted to be moved to its open position when the fluid pressure within the system exceeds a certain amount, and a second weighted valve within the housing in its open position with respect to said outlet adapted to be moved to its closed position when pressure within the system reaches a predetermined amount.

2. In a fluid conveying system, a main conduit, a branch conduit having an outlet, a relief valve controlling said outlet, a check valve in said branch conduit, a valve housing having an inlet from said main conduit, and a valve within said housing adapted to be moved by the fluid pressure within the main conduit to prevent the passage of fluid through said branch conduit.

3. In a power plant, a generator for supplying steam under pressure, an engine, a conduit for conveying steam from said generator to said engine, a throttle valve, a by-pass for conveying low pressure steam to said conduit and to said engine, a relief valve having an opening communicating with said conduit to permit the escape of steam when the pressure within said conduit exceeds a certain amount, and means actuated by the steam pressure within said conduit upon the opening of said throttle valve to render said relief valve ineffective.

4. In a fluid conveying system, a conduit having a pair of outlet apertures, a valve housing having inlets communicating with said outlet apertures respectively and also provided with an outlet aperture, a weighted valve within said housing, a second valve housing having an inlet communicating with said outlet in the first mentioned valve housing and having an outlet, and a weighted valve within the last mentioned housing normally closing the inlet of same.

5. In a fluid conveying system, a conduit having a pair of outlet apertures, a valve housing having inlet apertures communicating with said outlet apertures respectively and also provided with an outlet aperture, a weighted valve within said housing having a piston portion and a valve plate portion, said portions being of different diameter whereby the valve may be subject to differential load imposed thereon by pressure within said conduit, said piston portion being mounted slidingly within said housing, a valve seat formed at one of said inlets to said housing receptive of said valve plate portion, a second valve housing having inlet and outlet apertures, the last mentioned inlet aperture communicating with the outlet aperture of the first mentioned housing and having a valve seat, and a weighted valve within the second valve housing normally engaging the last mentioned valve seat.

6. In a fluid conveying system, a conduit having a pair of outlet apertures, a valve housing having an outlet aperture and also having an inlet aperture communicating with one of said outlet apertures, a second valve housing having an outlet aperture and also a pair of inlet apertures communicating with an outlet aperture of the conduit and the first mentioned valve housing respectively, a third valve housing having inlet and outlet apertures, the last mentioned inlet aperture communicating with the outlet of said second housing, valves slidably mounted in each of the aforementioned housings respectively, a valve seat formed at the inlet aperture of the first mentioned housing receptive of valve contained in that housing, a valve seat formed at one of the inlet apertures of the second housing receptive of the valve contained in that housing, and a valve seat formed at the inlet aperture of the third housing receptive of the valve contained in that housing.

7. In a fluid conveying system, a conduit for the passage of a fluid and having an outlet intermediate its ends, means closing said outlet adapted to be moved to an open position with respect to said outlet by a predetermined pressure of the fluid within said conduit to permit the escape of said fluid, and means disposed in an open position with respect to said outlet adapted to be moved by a pressure of fluid higher than the aforementioned pressure to close said outlet.

8. In combination with a locomotive main steam line, of an auxiliary engine, and auxiliary steam line communicating said auxiliary engine with said main steam line and having an outlet to permit the escape of steam, a throttle valve in said auxiliary steam line, a by-pass for supplying low pressure steam to said auxiliary engine when said throttle valve is in its closed or partially closed position, means closing the aforementioned outlet adapted to be moved to an open position with respect to said outlet by a predetermined pressure of the fluid within said conduit, and means disposed in an open position with respect to said outlet adapted to be moved by a pressure of fluid higher than the aforementioned pressure to close said outlet.

In testimony whereof I hereunto affix my signature.

RICHARD J. McCARTY, Jr.